July 20, 1965  J. MERCIER  3,195,901
SEALING MEANS FOR SLIDABLE MEMBER IN A PRESSURE UNIT
Filed March 7, 1961
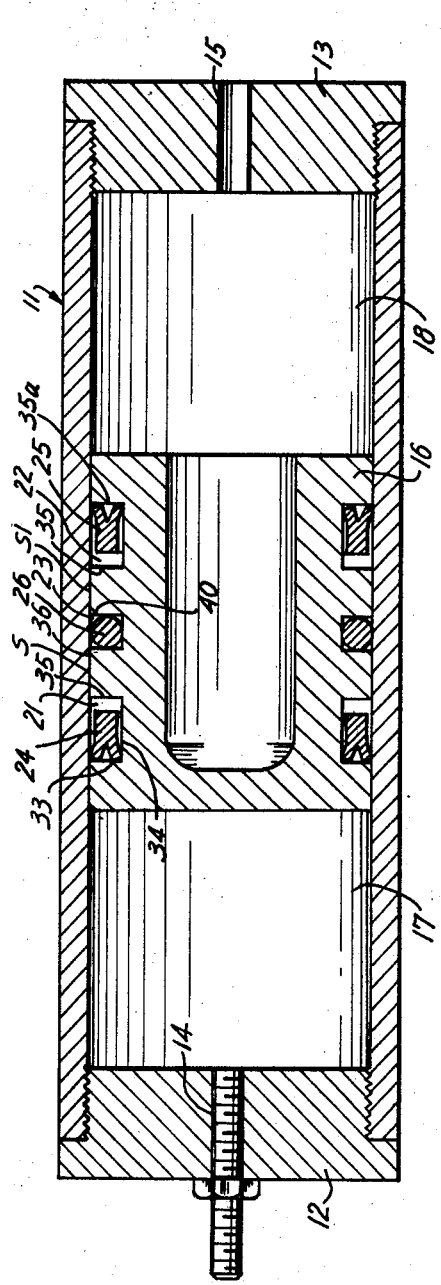
INVENTOR.
JEAN MERCIER
BY
Dean, Fairbank & Hirsch
ATTORNEYS

United States Patent Office 3,195,901
Patented July 20, 1965

3,195,901
SEALING MEANS FOR SLIDABLE MEMBER IN A PRESSURE UNIT
Jean Mercier, 1185 Park Ave., New York, N.Y.
Filed Mar. 7, 1961, Ser. No. 94,047
2 Claims. (Cl. 277—58)

This invention relates to a pressure unit having a sliding partition therein and more particularly to the sealing means therefor. It is among the objects of the invention to provide resilient sealing means for the slidable member of a pressure unit which will substantially preclude transfer of fluid from one side of the sealing means to the other, which will, during normal operation of the unit, provide dependable sealing action with a minimum of friction and will prevent extrusion and injury to the sealing means by relieving the fluid pressure thereagainst, which sealing means are simple in construction, strong and durable and are not likely to become deranged even with long periods of use.

According to the invention these objects are accomplished by the arrangement and combination of elements hereinafter described and more particularly recited in the claims.

In the accompanying drawings in which are shown one or more of various possible embodiments of the several features of the invention, FIG. 1 is a longitudinal sectional view of a piston accumulator according to the invention, FIG. 2 is an enlarged sectional view of the bifurcated sealing member, and FIG. 3 is a longitudinal sectional view with parts broken away of another embodiment of the invention.

Referring now to the drawings, in the embodiment shown in FIG. 1, a pressure vessel is provided comprising a cylindrical container 11 of rigid material capable of withstanding high pressures, said container having plugs 12 and 13 secured in each end thereof, said plugs having a gas inlet port 14 and an oil port 15 respectively.

Slidably mounted in the container is a piston 16 defining a gas chamber 17 and a fluid chamber for oil, for example, in communication with ports 14 and 15 respectively.

The piston 16 has peripheral annular grooves 21, 22 adjacent each end and an intermediate peripheral annular groove 23 is centrally located between grooves 21, 22, a resilient annular sealing member 24, 25 and 26 being positioned in said grooves respectively.

The sealing member 26 desirably is an O ring of conventional type. Each of the sealing members 24, 25 comprises an annulus which has one side thereof between its inner and outer peripheries bifurcated as at 27 to define a pair of normally outwardly flaring annular lips 28, 29, the region between the lips illustratively being substantially triangular.

As is clearly shown in FIG. 2, the thickness of the sealing members 24, 25 is greatest at the bifurcated side thereof defining relatively thin sealing edges 31, the portions of the outer and inner peripheries of said sealing members tapering inwardly to the side 32 thereof opposed to the bifurcated side.

In addition, the inner edges 33 of each of the lips extends outwardly beyond such sealing edges 31 for the purpose hereinafter to be described.

As shown in FIG. 1, the annular grooves 21, 22 in which the sealing members 24, 25 are positioned, are of depth just slightly less than the thickness of the sealing members at the sealing edges 31 thereof, so that such sealing edges will engage the floor 34 of the groove and the inner wall surface of the container, with the bifurcated sides 27 of the sealing members directed outwardly.

In addition, the width of said grooves 21, 22 is greater than the width of the sealing members 24, 25 to permit longitudinal movement of the latter in the associated groove.

The annular groove 23 in which O ring 26 is positioned is of depth slightly less than the diameter of said O ring so that the latter will engage the floor of the groove 23 and the inner wall surface of the container.

OPERATION

Before the chambers 17 and 18 are charged, the pressure in the spaces S and $S^1$ between the O ring 26 and the sealing members 24, 25 respectively and in such chambers will be atmospheric. When chambers 17 and 18 are charged, for example, with gas and oil under pressure, as the pressure in spaces S and $S^1$ is still atmospheric, there will be a differential between the pressure on opposed sides of the sealing members 24, 25.

As the greater pressure will be against the outer surface of the lips 28, 29 they will be spread outwardly so that the edges 31 thereof will more securely outwardly so that the edges 31 thereof will more securely engage the floor 34 of the associated groove and the inner surface of the container wall to form a dependable seal. Thus, there will be substantially no leakage between the fluids in the chambers 17, 18. In addition, the members 24, 25 will be moved toward each other until their sides 32 abut against the side wall 35 of the associated groove 21, 22.

In use of the unit, a valve (not shown) controlling the oil port 15 is opened. As a result, the pressure in chamber 18 will drop and by reason of the greater pressure in chamber 17, the piston will move to the right, forcing oil from chamber 18.

As a result of such movement of the piston 16, oil from the film adhering to the wall of the container may be forced past the edges 31 of sealing member 25 into the space $S^1$ and the pressure in such space will increase due to the compression of air therein.

As the pressure in space $S^1$ increases, and as the pressure in space S is initially atmospheric, the O ring 26 will be forced to the left and will wedge in the space 36 between the wall of the container and the periphery of the piston 16 to provide a dependable seal at such point.

So long as the pressure in space $S^1$ on the right side of O ring 26 remains below that in chamber 18; and the pressure in space S on the left side of O ring 26 is less than that on the right side, the three sealing members will form dependable seals, to preclude transfer of oil from chamber 18 to chamber 17 except for the adhering film which is negligible, i.e., the O ring 26 will wedge into the space 36 and the sealing edges 31 will engage the floor of the associated grooves and the inner wall surface of the container.

If the pressure in the space $S^1$ on the right side of the O ring 26 with operation of the unit and movement of the piston should, due to repeated wiping of the oil film into space $S^1$, build up to exceed the pressure in chamber 18 (based upon the force exerted against lips 28, 29 and the inherent force exerted by the sealing edges 31) the lips 28, 29 of member 25 will move toward each other to act as a valve to relieve the pressure in space $S^1$ until it falls substantially to the pressure in chamber 18. As a result, extrusion of member 25 is prevented. Such increase of the pressure in space $S^1$ will also cause the member 25 to move to the right in groove 22 until the edge 33 abuts against the wall 35a of said groove. Abutment of edges 33 will prevent injury to the sealing edges 31 as they are not subject to impact against wall 35a.

If, at this time, additional oil under pressure is forced into the oil port 15 to recharge the accumulator, it will react against the bifurcated side of the sealing member 25 causing the lips thereof to spread apart. However, the fluid under pressure will also cause the sealing member 25 to move to the left, and reacting against the oil in space $S^1$ to further compress the entrapped air in such space, the movement of the sealing member 25 continuing until an equilibrium has been reached between the pressure in space $S^1$ and the pressure in chamber 18. As a result, the sealing edges 31 will be urged against the floor of annular groove 22 and the inner wall surface of the container only by the inherent resilience of the member 25 and hence the friction of the sealing edges thereof against the container will be reduced to a minimum.

It is apparent that during normal operation of the device, there will be oil present in the space $S^1$ during such operation. Since the pressure in such space and in chamber 18 will be equalized, a sliding seal will be provided with a minimum of friction.

Furthermore, whenever the pressure in such space $S^1$ exceeds that in chamber 18, the lips 28, 29 will be moved toward each other to relieve such pressure thereby preventing extrusion of such lips and destruction of the seal.

Due to alternative movement of the piston and wiping of the oil film by sealing members 24 and 26, oil will accumulate in space S and the pressure on the left side of the O ring will build up. If such pressure should exceed that in chamber 17, the lips 28, 29 of member 24 will be moved inwardly to relieve such pressure. Prior to such movement, the pressure in the space S on the left side of the O ring would have risen to exceed that in space $S^1$ and the O ring 26 will wedge into the space 40 in the right side of groove 23 to form a dependable seal.

Furthermore, with the space S charged with oil, when additional oil under pressure is forced into the oil port to move the piston 16 to the left, it will cause the pressure in chamber 17 to rise above that in the space S. As a result, the lips 28, 29 of member 24 will spread apart. However, the gas under pressure in chamber 17 will also cause the sealing member 24 to move to the right reacting against the oil in space S further to compress the entrapped air, the movement of the sealing member continuing until equilibrium has been reached between the pressure in space S and the pressure in chamber 17. As a result, the sealing edges 31 will be urged against the floor of annular groove 21 and the inner wall surface of container 11 only by the inherent resilience of the member 24 and hence the friction of the sealing edges 31 against the container will be reduced to a minimum.

In the embodiment shown in FIG. 3, in which parts corresponding to those in FIGS. 1 and 2 have the same reference numerals primed, the sealing means are, illustratively shown incorporated in the container wall 11' of an hydraulic jack, for example, which has a slidable piston 16'.

In the operation of the unit, shown in FIG. 3, the chamber 41 is charged with a fluid such as oil under pressure. As the spaces S' and $S^{1\prime}$ initially are under atmospheric pressure, the pressure against the lips 28', 29' of member 24' will spread such lips as previously described to form a dependable seal at edges 31'. As the pressure against both surfaces of O ring 26' is substantially atmospheric, such O ring seal is not effective as a seal at this time.

When the piston 16' moves during normal operation of the unit, the wiping action of the sealing members will cause pressure build up in spaces S' and $S^{1\prime}$ as previously described.

Increase in pressure in space S' will cause the O ring 26' to be forced into the space 40' to form a dependable seal. In the event the pressure in space S' should increase to an amount greater than that in chamber 41 plus the force exerted by sealing edges 31', the lips 28', 29' will be moved toward each other to relieve such pressure before extrusion can occur.

Pressure build up in space $S^{1\prime}$ that exceeds the force exerted by the sealing edges 31' will cause the lips of member 25' to move together to vent such excess pressure which will occur before the O ring can move out of the space 40' in which it is wedged so that a dependable seal will be maintained.

In addition, with the space S' charged with oil, which will cause the sealing member 24' to move toward the left, additional oil under pressure forced into chamber 41 will cause equilibrium to result so that effectively only the friction caused by the inherent resilience of the sealing edges 31' of member 24' will be present.

With the simple construction above described, an effective sliding seal will be provided without likelihood of destruction of the seals during normal operation due to excessive pressure or friction of the sealing members.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described comprising a cylindrical container unit and a plunger unit slidably mounted in said container unit, one of said units having three longitudinally spaced annular grooves, a resilient sealing member in each of said grooves, each of the sealing members in the grooves on each side of the intermediate groove comprising an annulus, the sides of each annulus remote from the intermediate groove being bifurcated to define a pair of spaced annular lips, with the bifurcated sides of each annulus directed outwardly of the intermediate groove at least a portion of each of said lips on the inner and outer periphery of said annulus normally engaging the wall of the associated groove in one of said units, and the opposed wall of the other of said units to define a seal, the engaging portion of each of said lips being conformed to define a relatively thin sealing edge, the thickness of said annulus being greatest at said thin sealing edge, said sealing member in the intermediate groove being an O ring, the width of each of the grooves on each side of the intermediate groove being greater than the width of the annulus to permit longitudinal movement of the latter in the associated groove.

2. The combination set forth in claim 1 in which a portion of each of said lips extends outwardly longitudinally beyond the thin sealing edge.

References Cited by the Examiner

UNITED STATES PATENTS

| | | | |
|---|---|---|---|
| 2,660,493 | 11/53 | Flick | 286—26.5 X |
| 2,780,504 | 2/57 | Russell | 138—31 X |
| 2,873,763 | 2/59 | Mercier | 138—31 |
| 2,934,368 | 4/60 | Adamson | 277—153 |
| 2,979,350 | 4/61 | Lansky | 286—26.5 |

FOREIGN PATENTS

| | | |
|---|---|---|
| 1,244,391 | 9/60 | France. |
| 23,826 | 1906 | Great Britain. |

EDWARD V. BENHAM, *Primary Examiner.*

MORRIS M. FRITZ, SAMUEL ROTHBERG, *Examiners.*